Nov. 4, 1941.  E. G. MATHAUER  2,261,693
PASSENGER VEHICLE
Original Filed May 17, 1939  5 Sheets-Sheet 5
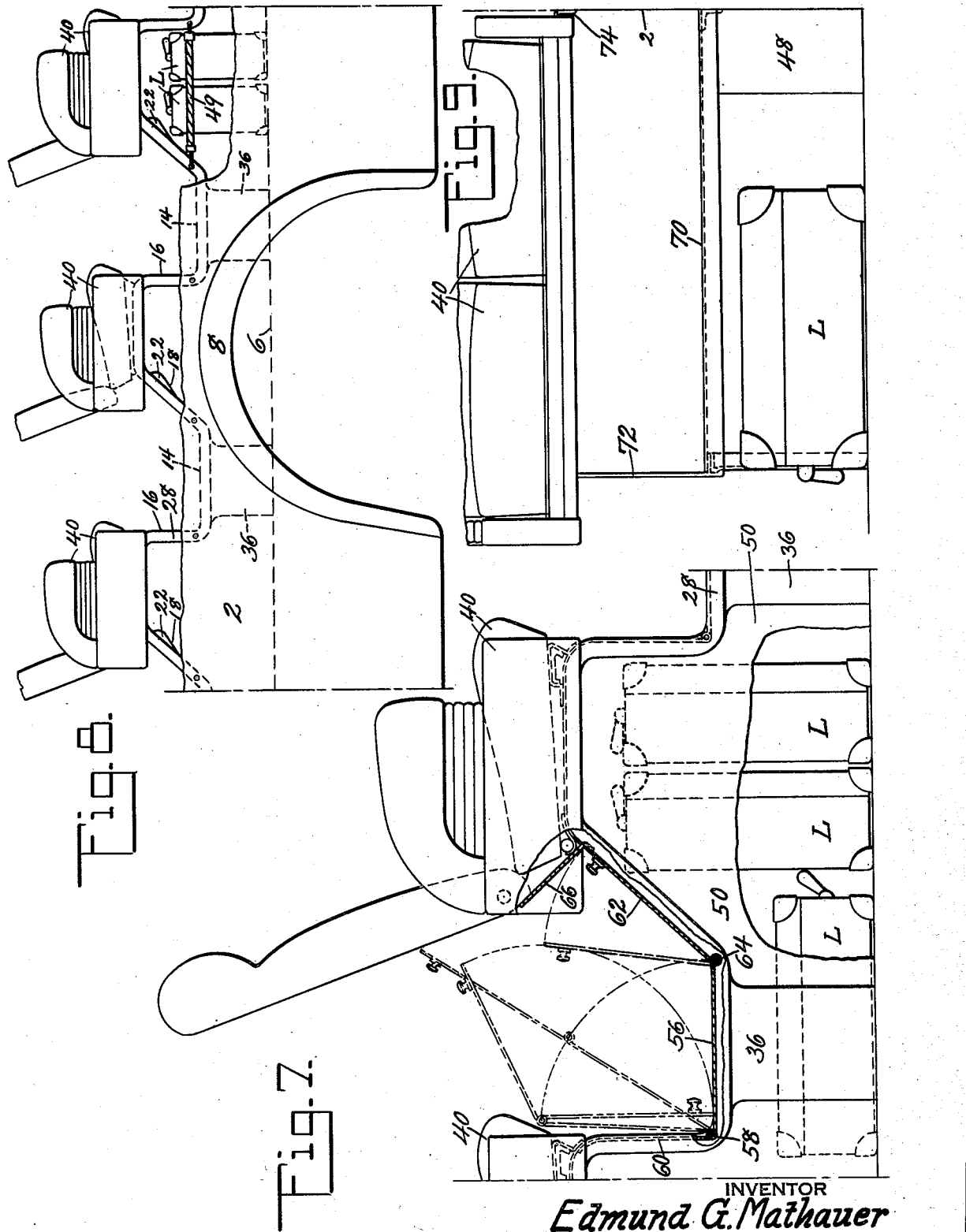
INVENTOR
Edmund G. Mathauer
BY
Donald U. Rich
ATTORNEY Patented Nov. 4, 1941

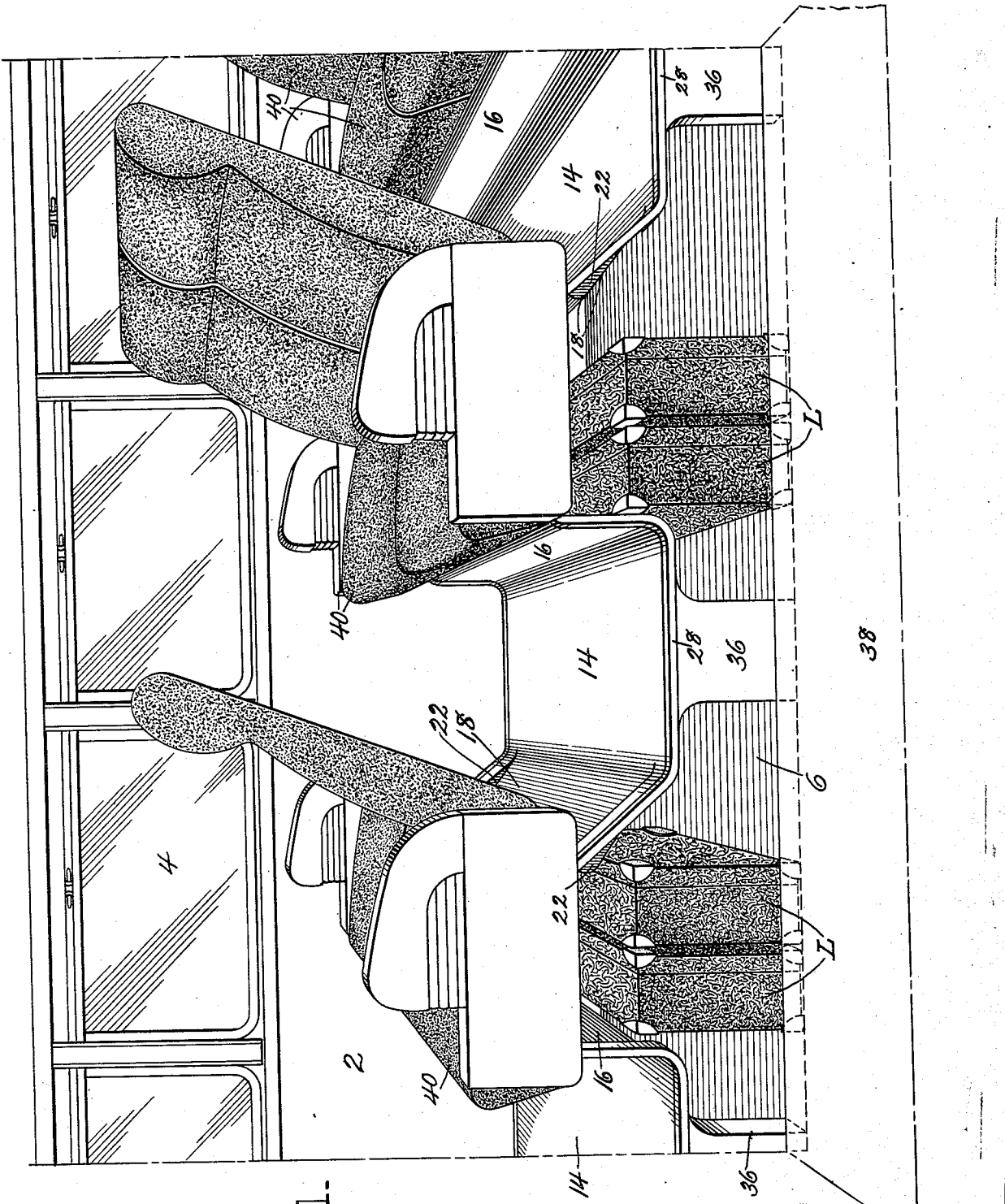

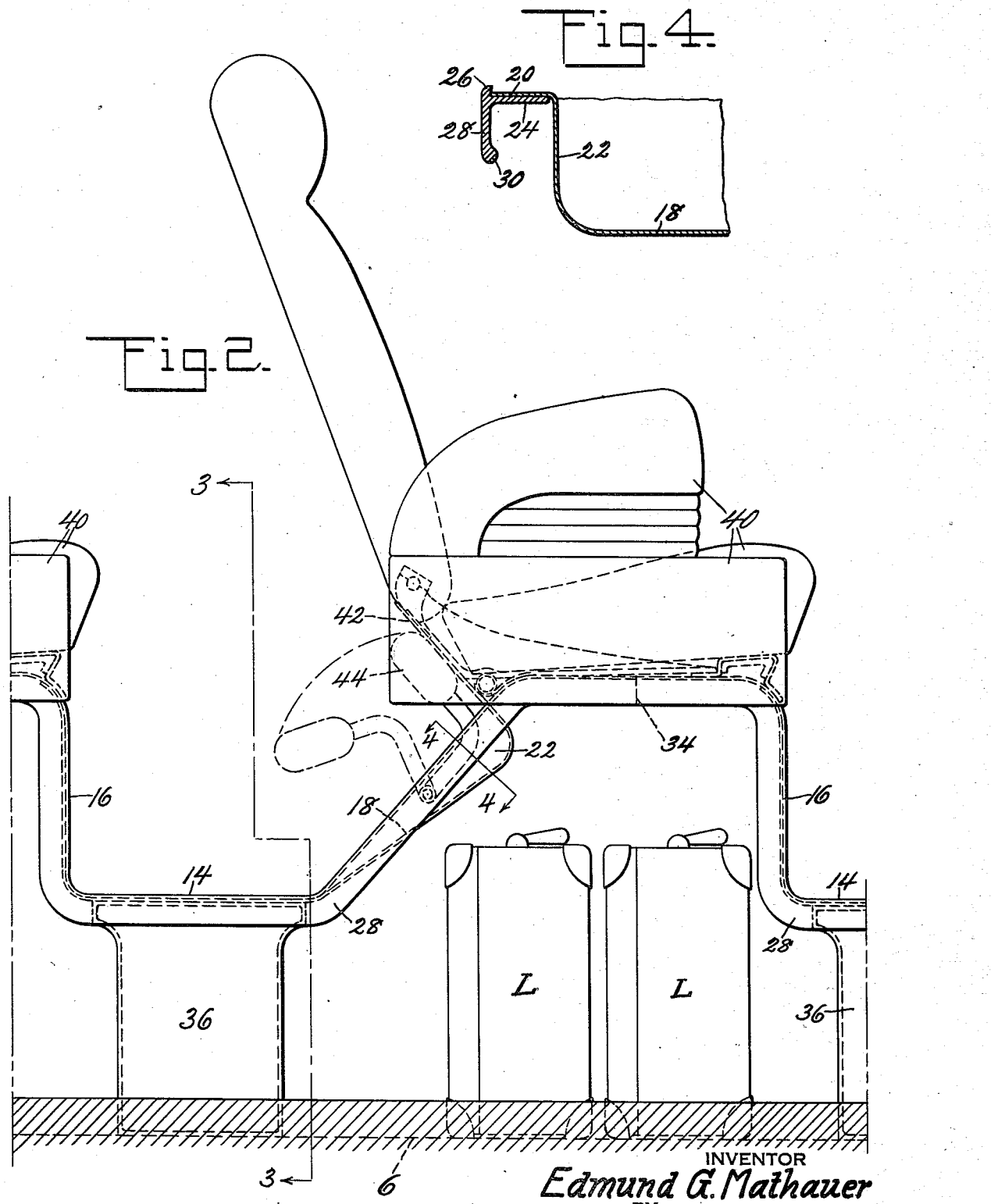

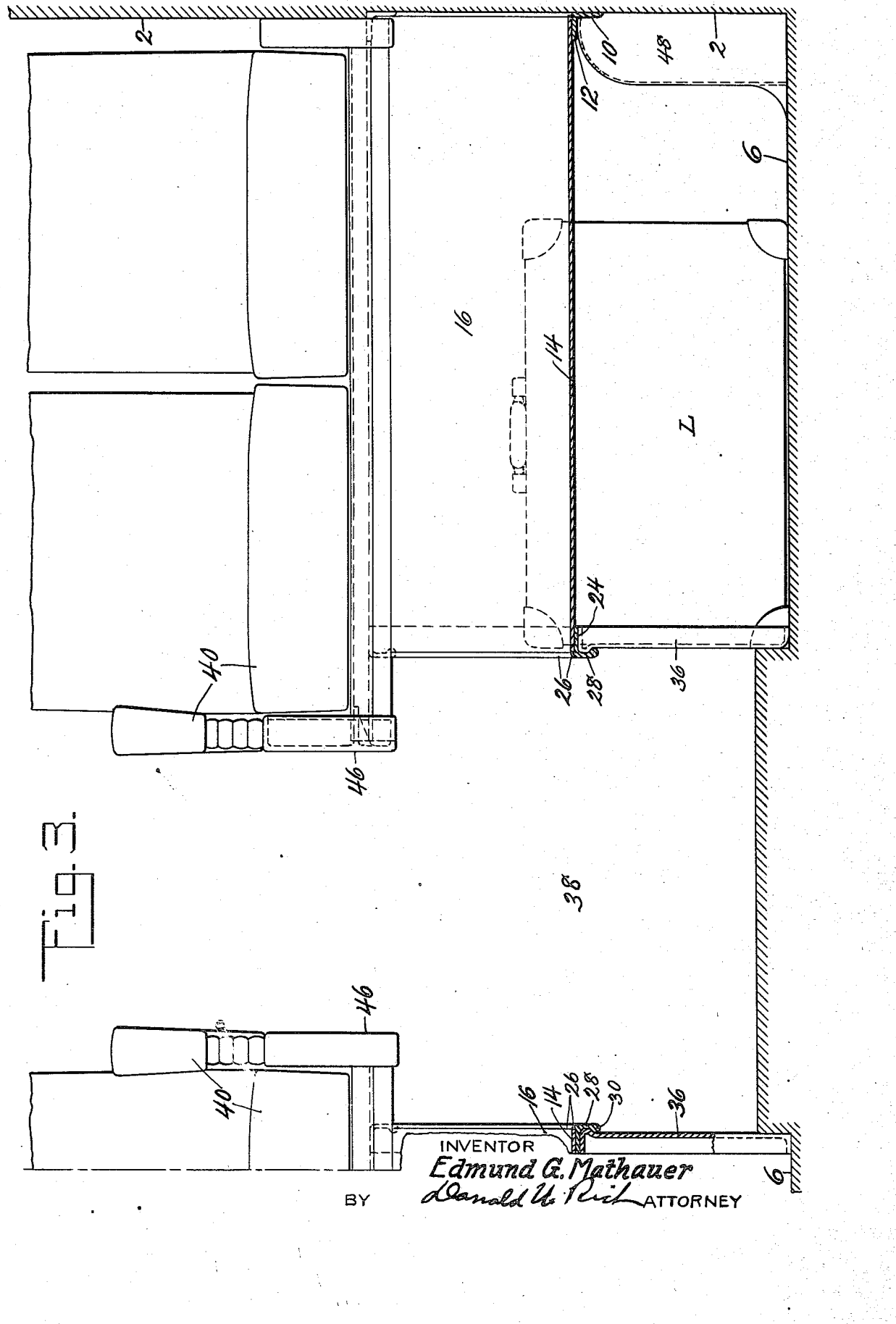

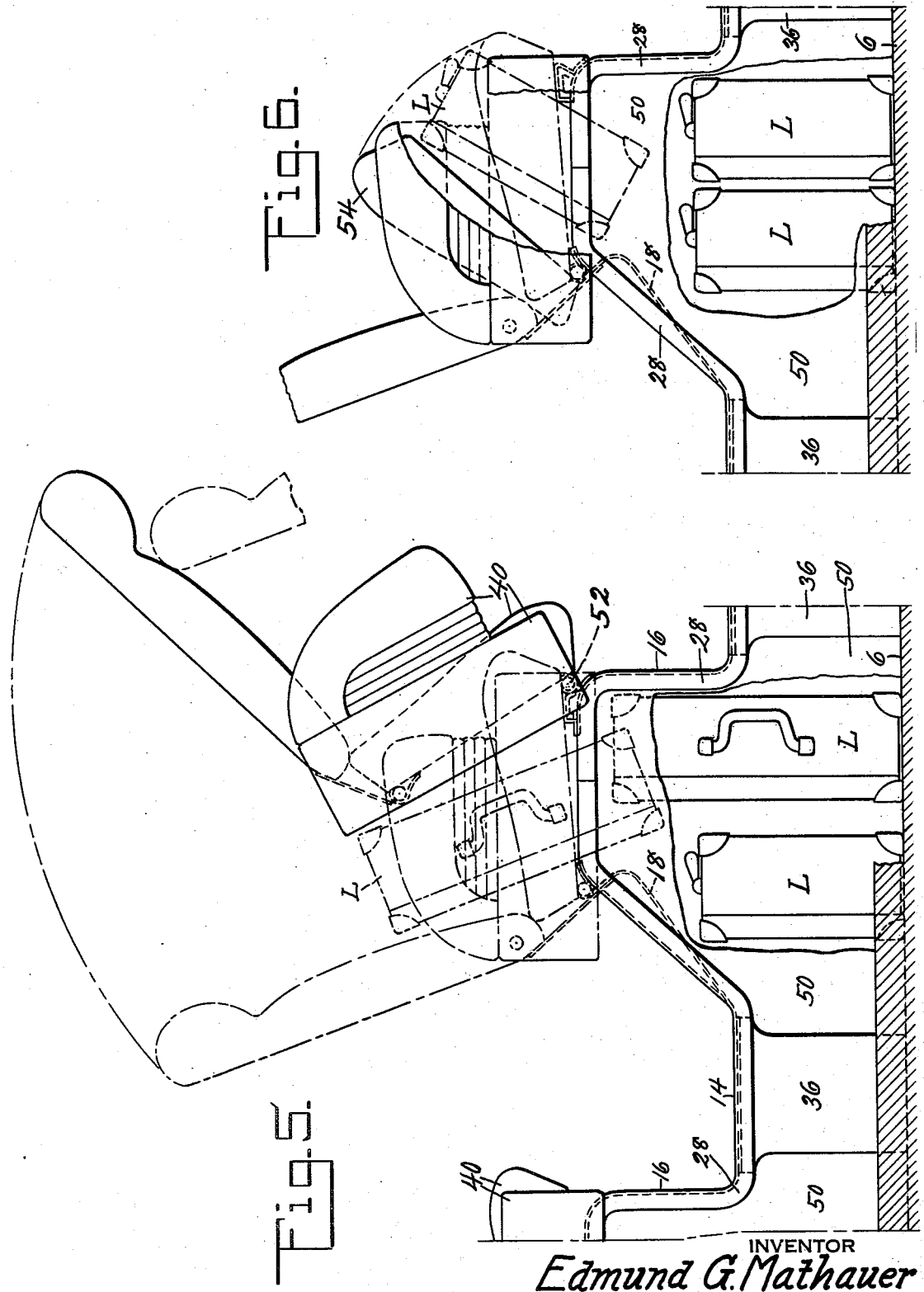

2,261,693

UNITED STATES PATENT OFFICE 2,261,693

PASSENGER VEHICLE

Edmund G. Mathauer, Upper Darby, Pa., assignor to American Car and Foundry Motors Company, New York, N. Y., a corporation of Delaware Substituted for abandoned application Serial No. 274,142, May 17, 1939. This application May 6, 1941, Serial No. 392,068

4 Claims. (Cl. 296—37)

This invention relates to passenger vehicles in general and has particular reference to motor driven vehicles for the transport of passengers and luggage. This application is a substitute for application Serial No. 274,142, filed May 17, 1939.

In the past the majority of passenger carrying vehicles used in interstate service have been built with the luggage and parcel rack located in the roof zone above the seats but such a placement of the luggage rack is extremely inconvenient due to the necessity of lifting large heavy baggage to a level even with or above the person's head. The placement of baggage above the seats has also been a source of danger due to the possibility of baggage falling on the occupants of the seats and such as particularly true in case of an accident or in case the vehicle either completely or partially overturns. More recent construction has permitted the storage of baggage beneath the vehicle floor with access to the baggage space being obtained through doors cut in the side of the vehicle. Placing the baggage beneath the floor in such compartments accessible only from the side of the vehicle has made it extremely inconvenient to enter or remove luggage particularly at points where no shelter is provided. Such placement of luggage frequently requires the presence of the owner necessitating their being subjected to rain or snow while the driver either places the luggage in the compartment or removes it therefrom. Storage of the luggage in these large underfloor compartments also results in considerable damage to the luggage due to scuffing since there are so many varying types and conditions of luggage stored in the one large compartment and unrestrained from shifting. It has also been found that practically all passengers feel uneasy at placing their luggage in the compartments out of their sight, while a large number are extremely reluctant to have their luggage so placed. The placement of the luggage beneath the floor and accessible only from the exterior of the vehicle results in considerable delay since the only person authorized to remove the luggage is the driver and in order to avoid delay the majority of operating companies or the drivers themselves have reserved the two seats immediately behind the driver for the storage of luggage of passengers entering or leaving the bus intermediate the main terminals. Such a reservation of space necessarily reduces the pay load for which the vehicle is designed. It is an object, therefore, of the present invention to provide a passenger carrying vehicle in which the luggage is carried inside the vehicle and beneath the seats or seat supporting platform, thereby permitting easy entrance and removal of the luggage.

A further object of the invention is the provision of a passenger carrying vehicle in which the seats are supported upon an irregular or sawtooth platform, which platform forms a protection for luggage or articles carried on the vehicle floor beneath the platform.

Another object of the invention is the provision of a passenger carrying vehicle in which the seats are supported upon a platform spaced above the vehicle floor and upon which luggage may be carried interiorly of the vehicle and beneath the platform while at the same time yielding constant leg room between seats throughout the vehicle.

Yet another object of the invention is the provision of a passenger carrying vehicle in which the seats are supported upon an irregular or sawtooth platform, the lower level of which is substantially coplanar with the wheel hood housings and which provides a space for luggage carried on the vehicle floor beneath the platform, while at the same time providing space for the concealment of air ducts or heating or cooling equipment.

A still further object of the invention is the provision of a passenger carrying vehicle in which luggage is carried upon the vehicle floor beneath the seats and without the necessity of cutting openings in the girder side wall of the vehicle thereby retaining the full strength of the girder.

These and other objects of the invention will be apparent to persons skilled in the art from a study of the following description and accompanying drawings, in which:

Figure 1 is a perspective view of a portion of the improved vehicle;

Fig. 2 is an elevational view of a portion of the vehicle disclosing the construction of the seat supporting platform;

Fig. 3 is a cross sectional view taken substantially on line 3—3 of Fig. 2 and disclosing the platform, aisle and seat arrangement;

Fig. 4 is a sectional view taken substantially on line 4—4 of Fig. 2;

Fig. 5 is an elevational view similar to Fig. 2 but showing a modification thereof;

Fig. 6 is an elevational view similar to Fig. 5 but showing a slight modification thereof;

Fig. 7 is an elevational view similar to Fig. 2 but showing a further modification;

Fig. 8 is an elevational view showing the relationship of the seats, seat supporting platform and wheel hood, and Fig. 9 is a partial sectional view similar to Fig. 3 but showing a slight modification thereof.

Referring now to the drawings in detail, it will be seen that the vehicle is constructed with the more or less conventional side wall 2, preferably of plate girder construction, and formed with openings for reception of windows 4 as is customary. The girder side walls are joined together by a floor 6 located as closely adjacent the vehicle axles as is possible. This will, of course, cause the wheel housings 8 (Fig. 8) to project into the vehicle interior. The vehicle side walls and floor may be constructed in the manner shown by Patents 1,743,211 or 2,139,807, but since this invention does not deal with the vehicle frame, the exact construction of the frame has not been shown. Angles or other form metal members 10 are attached to the side walls on the interior surface thereof and have one leg or flange 12 thereof extending inwardly to support the platform sheet. As clearly shown in Figs. 1 to 8 inclusive the platform sheet is formed with a horizontal lower level portion 14 merging at one edge into a vertical portion 16 and at the other edge into an inclined foot-rest portion 18. The footrest portion is preferably pressed or formed to provide side edge portions 20 joined by varying depth walls 22 to the footrest portion, thus permitting the edges of the sheet to be inclined at a relatively sharp angle, while the footrest portion may be inclined at an angle giving maximum comfort to persons desiring to use the same. The inner or aisle edges of the platform sheets are supported upon horizontal flange 24 of an extruded angle form member having a short flange 26 projecting vertically and protecting the edges of the platform sheet, while a relatively long flange 28 extends downwardly to give strength to the angle extrusion. The lower edge of this downwardly directed flange perferably terminates in a bulb end 30 (Fig. 4), thus preventing any injury to articles placed beneath the platform. The outer extruded angle and the side wall carried angle are bent to conform to the platform sheets which they support and these angles may extend continuously from end to end of the vehicle or as indicated in Fig. 2 they may be made in short lengths and joined together as at 34 beneath the seats. The inner or aisle angle is supported by means of standards 36 attached to the floor at one side of the aisle or passageway 38 and as clearly shown in Fig. 3 these standards and the extruded angles are set inwardly an appropriate distance from the ends of the seats for a purpose later to be referred to. As clearly shown in Figs. 1 to 8 the wall carried angle and the angle carried by the standards at the aisles are formed with substantially horizontal portions upon which the seats 40 of any desired construction may be supported. It is, of course, obvious that if desired the platform sheets may extend across beneath the seats, but it is preferable that the sheets terminate adjacent the points of attachment of the seats to the supporting angles thereby saving weight and fabrication costs. As shown in Fig. 2 the footrest portion 18 is extended upwardly as at 42 in order to protect the back of the adjacent seat in case it is found desirable to use a footrest 44 which is normally folded against the plate 42 but which may be folded out into position for use. The seats are supported upon the upper level of the platform at the proper distance for passenger comfort above the lower level portion 14, while the inner ends 46 of the seats are located at the proper distance apart to provide ample aisle space for entrance and exit of passengers. By terminating the platforms inwardly from the ends of the seats ample space is provided for the insertion of luggage L into the space beneath the seats and if desired such luggage may be turned on its side and stored under the lower level portion 14. It will thus be seen that ample space is provided beneath each double seat and its footrest portion for at least three large suitcases or travelling bags. It is evident that the luggage stored beneath the seats will not require the full space and accordingly heating or cooling equipment or air ducts 48 (Figs. 3 and 9) may be located beneath the platform and adjacent the side walls of the vehicle. The floor level in the luggage storage space is preferably located at a slightly lower level than the aisle floor as clearly shown in Fig. 3 in order to retain luggage in position beneath the seats, although this same result may be accomplished if desired by merely inclining the floor downwardly from the aisle toward the side walls. It may be desirable also to utilize a flexible rubber band or other means 49 (Fig. 8) extending between the downwardly directed flange of the aisle angle in order to retain tall or stacked luggage in position.

In certain instances it may be desirable to close the luggage space adjacent the aisle and this may be accomplished as shown in Figs. 5, 6 and 7 by connecting the aisle plate to the floor by means of sheets 50. With the baggage space totally enclosed by the platform and aisle sheet, entrance to the baggage space may be obtained by hinging the forward edge of the seat assembly as at 52 to the supporting structure (Fig. 5). In this way the entire seat may be folded forward permitting the luggage L to be lowered into the luggage space through the opening available by tilting the seat. In case such an arrangement is used a seat lock of any improved type would be used normally locking the seat in its passenger receiving position.

Access to the closed baggage space may also be provided by either removing the seat cushion 54 or folding such cushion upwardly as clearly shown in Fig. 6 and again permitting the luggage L to be lowered into the storage space. Such an arrangement is preferable to that shown in Fig. 5 since the seat structure as a whole may be firmly attached to the supporting platform thereby eliminating the possibility of injury in case of collision.

Entrance to the closed baggage space may also be obtained as shown in Fig. 7. In this modification the lower level portion 56 of the platform is hinged as at 58 to the vertical rigid portion 60, while the footrest portion 62 is hinged as at 64 to the forward edge of the lower level portion. The footrest portion has its free edge resting upon an angular supporting plate 66 carried by the next forward seat supporting structure. In this form the footrest portion and lower level platform portion may be folded upwardly permitting entrance of luggage into the storage space, while at the same time permitting the seats to be rigidly attached, as is customary, to their supporting structure.

In certain service it may be found desirable to restrict the baggage space and extend the lower level or platform 70 (Fig. 9) continuously beneath the seats, in which case the luggage L may still be introduced from the aisle but must be placed on its side. In this form the seats will, of course, be supported from the platform by an upwardly extending aisle standard 72 and by a wall carried angle or other means 74.

It will be evident to persons skilled in the art that a strong vehicle construction such as shown in Patents 1,743,211 or 2,139,807 may be used and to which structure may be attached the angles and raised platform previously described, thereby permitting storage of luggage inside the vehicle where it may be readily removed by its owners or opened to remove articles required during travel. By utilizing the arrangement shown and described the girder side walls will not have unnecessary openings cut therein and will be joined by a strong floor structure capable of supporting the luggage and passenger load while the raised irregular platform structure need support only the weight of the seats and passengers. Such an arrangement will permit of considerable economy in metal while maintaining maximum structural strength and at the same time providing for storage of luggage in a more advantageous position. With the luggage stored as disclosed each passenger will be able to take care of and watch his own luggage and obtain access thereto for removal of necessities during travel. It will also be obvious to persons skilled in the art that by such a construction as that previously described the floor level may be carried as low as possible thereby permitting the lowering of the ceiling to the proper height above the floor level, while the seats may be carried upon the platform located at such a level as to give constant leg room throughout the length of the bus. Such constant leg room is possible due to the fact that the platform is at a level substantially coplanar with the upper surface of the wheel hoods.

While the invention has been described more or less in detail, it is obvious that various modifications and rearrangements of parts, other than those shown and described, may be made and all such modifications and rearrangements of parts are contemplated as will come within the scope of the following claims which define my invention.

What is claimed is:

1. In a passenger vehicle having side walls and a floor connecting the side walls the combination of means secured to the side walls above the floor, means supported by the floor between the side walls of the vehicle, platforms carried by said means in vertically spaced relation to said floor to thereby provide storage space between the floor and platform, said platforms having their inner edges spaced apart to provide an aisle adjacent the floor and being so formed as to provide openings permitting entrance of luggage into said storage space from said aisle, and seats supported on said platform and having their inner ends overhanging said platform and restricting said aisle above the platform.

2. In a passenger vehicle having side walls and a substantially uniplanar floor connecting the side walls adjacent their lower edges, the combination of saw-tooth platforms carried by said vehicle interiorly thereof and adjacent each side wall, said sawtooth platforms being formed with valleys spaced vertically above said floor and with crests spaced vertically above the floor and a greater distance thereabove than said valleys, and seats secured to said crests with their inner ends overlapping the side edges of said platforms, said seats having their inner ends spaced apart sufficiently to form an aisle space for passage of passengers and said platform edges being spaced apart a greater amount to permit entrance of luggage from the aisle into the space between the platform and floor.

3. A passenger vehicle having side walls, a floor connecting said side walls including a passenger aisle, structures at each side of said passenger aisle forming combined luggage compartments and seat supports, each of said structures including inner and outer supporting members, said supporting members each comprising a top supporting structure and a fastening means, the outer supporting members having their fastening means secured to the adjacent vehicle side wall, spaced standards secured to the fastening means of the inner supporting members, said supporting members being provided with elevated seat supporting portions and intermediate low level platform supporting portions, seats on said elevated seat supporting portions, platforms on the low level portions, said seats and platforms constituting a substantially continuous cover for luggage compartments further defined by the floor and side walls of the vehicle and accessible only from the vehicle interior, said seats extending inwardly of said standards whereby clearance is provided beneath said seats for manipulation of luggage being inserted in said compartment.

4. A passenger vehicle having side walls, a floor connecting said side walls including a passenger aisle, structures at each side of said passenger aisle forming combined luggage compartments and seat supports, each of said structures including inner and outer supporting members, said supporting members each comprising a top supporting structure and a fastening means, the outer supporting members having their fastening means secured to the adjacent vehicle side wall, spaced standards secured to the fastening means of the inner supporting members, said supporting members being provided with elevated seat supporting portions and intermediate low level platform supporting portions, seats on said elevated seat supporting portions, platforms on the low level portions, said seats and platforms, constituting a substantially continuous cover for luggage compartments further defined by the floor and side walls of the vehicle and accessible only from the vehicle interior, said platforms and spaced standards being substantially spaced outwardly of the seat inner ends whereby increased aisle clearance is provided below the level of the seats for manipulation of standard size luggage being inserted in said compartments on either side of the aisle.

EDMUND G. MATHAUER.